United States Patent
Matsui et al.

(10) Patent No.: US 11,972,074 B2
(45) Date of Patent: Apr. 30, 2024

(54) TOUCH OPERATION DETECTION DEVICE AND TOUCH OPERATION DETECTION METHOD

(71) Applicant: SHARP KABUSHIKI KAISHA, Sakai (JP)

(72) Inventors: Kuniaki Matsui, Sakai (JP); Koichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/218,297

(22) Filed: Jul. 5, 2023

(65) Prior Publication Data
US 2024/0019955 A1    Jan. 18, 2024

(30) Foreign Application Priority Data
Jul. 12, 2022   (JP) .................... 2022-111876

(51) Int. Cl.
G06F 3/041   (2006.01)
(52) U.S. Cl.
CPC ........ *G06F 3/0416* (2013.01); *G06F 3/04146* (2019.05)
(58) Field of Classification Search
None
See application file for complete search history.

(56) References Cited

U.S. PATENT DOCUMENTS

| | | | | |
|---|---|---|---|---|
| 2013/0211757 A1* | 8/2013 | Miyamoto | ............ | G06F 3/0446 702/65 |
| 2018/0348950 A1* | 12/2018 | Nakanishi | ............. | G06F 3/0412 |
| 2021/0342062 A1* | 11/2021 | Nomura | ............. | G06F 3/04845 |

FOREIGN PATENT DOCUMENTS

JP    4927216 B1    5/2012

\* cited by examiner

*Primary Examiner* — Stephen T. Reed
(74) *Attorney, Agent, or Firm* — ScienBiziP, P.C.

(57) ABSTRACT

This display device includes: a drive processing unit inputs an input signal with respect to a plurality of drive lines; an output detection processing unit that detects an output signal that is output from a plurality of sense lines; a grouping processing unit that groups the plurality of drive lines into a plurality of groups each having a set grouped number of adjacent drive lines; and a touch operation detection processing unit that detects a touch operation made with respect to a touch panel based on a linear element sequence calculated by a matrix operation of an input sequence and an output sequence. The drive processing unit inputs the input signal having the same pattern to each of the grouped number of drive lines that have been grouped by the grouping processing unit.

8 Claims, 8 Drawing Sheets

TOUCH OPERATION DETECTION DEVICE AND TOUCH OPERATION DETECTION METHOD

INCORPORATION BY REFERENCE

This application is based upon and claims the benefit of priority from the corresponding Japanese Patent Application No. 2022-111876 filed on Jul. 12, 2022, the entire contents of which are incorporated herein by reference.

BACKGROUND

The present disclosure relates to a touch operation detection device that detects a touch operation made with respect to a touch panel, and a touch operation detection method.

Conventionally, in capacitance-type touch operation detection devices, a technique is known in which a voltage corresponding to a code sequence is input with respect to a plurality of drive lines, and a capacitance value formed between the drive lines and a sense line is calculated based on an inner product operation between an output value of the sense line and the code sequence.

In capacitance-type touch operation detection devices, further enhancement of the signal strength of detection signals is sought in order to detect more accurately a small change in the capacitance value due to a touch operation made with respect to a touch panel.

SUMMARY

An object of the present disclosure is to provide a touch operation detection device and a touch operation detection method that are capable of increasing the signal strength of a detection signal of a touch operation made with respect to a touch panel.

A touch operation detection device according to an aspect of the present disclosure is a device that, in a touch panel provided with a plurality of drive lines arranged in parallel, and a plurality of sense lines arranged in parallel and intersecting the plurality of drive lines, inputs an input signal with respect to the plurality of drive lines in parallel and drives the plurality of drive lines, detects an output signal from the plurality of sense lines in parallel, and detects a touch operation made with respect to the touch panel based on a linear element sequence corresponding to a magnitude of a capacitance at each intersection between the plurality of drive lines and the plurality of sense lines calculated based on a matrix operation of an input sequence corresponding to a magnitude of the input signal and an output sequence corresponding to a magnitude of the output signal. The touch operation detection device includes a drive processing unit, a detection processing unit, a grouping processing unit, and a touch operation detection processing unit. The drive processing unit inputs the input signal with respect to the plurality of drive lines. The detection processing unit detects the output signal that is output from the plurality of sense lines. The grouping processing unit groups the plurality of drive lines into a plurality of groups each having a set grouped number of adjacent drive lines. The touch operation detection processing unit detects a touch operation made with respect to the touch panel based on the linear element sequence calculated by a matrix operation of the input sequence and the output sequence. The drive processing unit inputs the input signal having the same pattern to each of the grouped number of drive lines that have been grouped by the grouping processing unit.

A touch operation detection method according to another aspect of the present disclosure is a method that, in a touch panel provided with a plurality of drive lines arranged in parallel, and a plurality of sense lines arranged in parallel and intersecting the plurality of drive lines, inputs an input signal with respect to the plurality of drive lines in parallel and drives the plurality of drive lines, detects an output signal from the plurality of sense lines in parallel, and detects a touch operation made with respect to the touch panel based on a linear element sequence corresponding to a magnitude of a capacitance at each intersection between the plurality of drive lines and the plurality of sense lines calculated based on a matrix operation of an input sequence corresponding to a magnitude of the input signal and an output sequence corresponding to a magnitude of the output signal. The touch operation detection method causes one or more processors to execute the steps of: inputting the input signal with respect to the plurality of drive lines; detecting the output signal that is output from the plurality of sense lines; grouping the plurality of drive lines into a plurality of groups each having a set grouped number of adjacent drive lines; detecting a touch operation made with respect to the touch panel based on the linear element sequence calculated by a matrix operation of the input sequence and the output sequence; and inputting the input signal having the same pattern to each of the grouped number of drive lines that have been grouped.

According to the present disclosure, it is possible to provide a touch operation detection device and a touch operation detection method that are capable of increasing the signal strength of a detection signal of a touch operation made with respect to a touch panel.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the accompanying drawings. Note that the following embodiments are merely examples that embody the present disclosure, and do not intend to limit the technical scope of the present disclosure.

Figure 1:
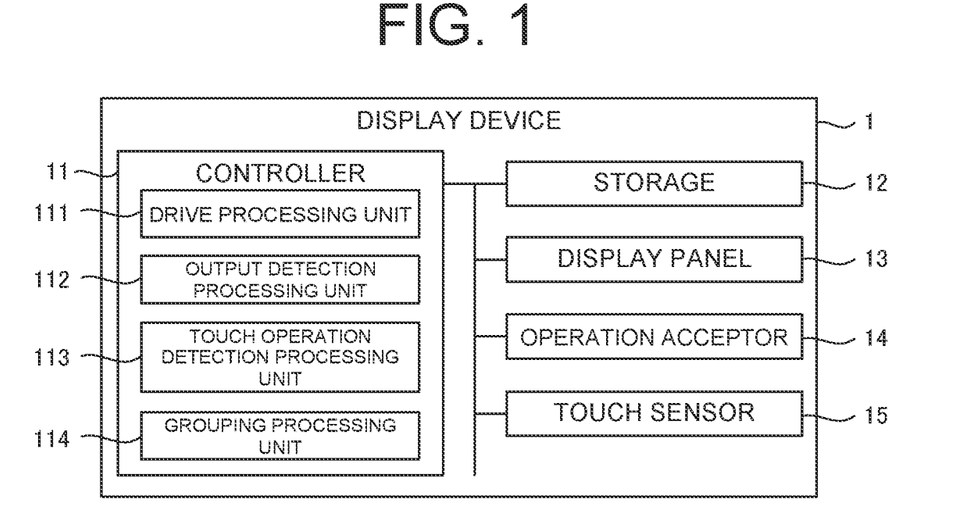
FIG. 1 is a block diagram illustrating a configuration of a display device according to an embodiment of the present disclosure.

As illustrated in FIG. 1, a display device 1 according to the embodiment of the present disclosure includes a controller 11, a storage 12, a display panel 13, an operation acceptor 14, and a touch sensor 15. The display device 1 is an example of a touch operation detection device of the present disclosure.

Figure 2:
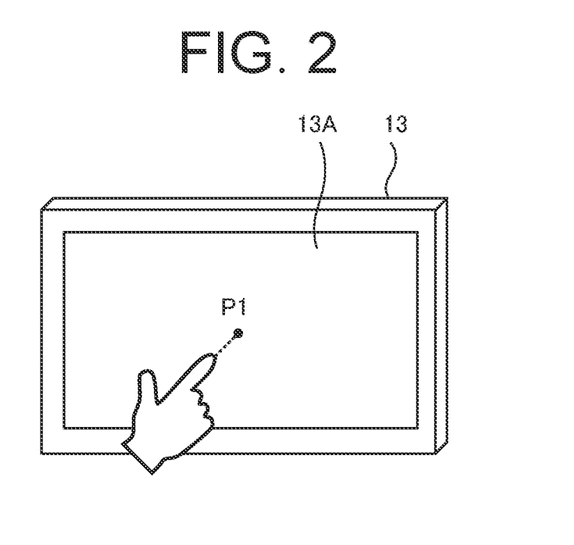
FIG. 2 is a diagram schematically illustrating an example of a hover operation on the display device according to the embodiment of the present disclosure.
Figure 3:
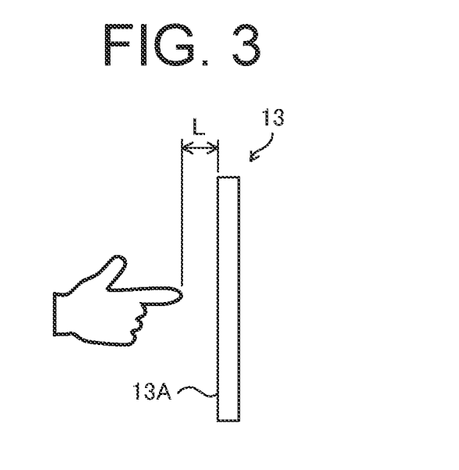
FIG. 3 is a diagram schematically illustrating an example of a hover operation on the display device according to the embodiment of the present disclosure.

The display device 1 is a capacitance-type display device that is capable of accepting a touch operation due to the user making contact with a display screen 13A (hereinafter referred to as a contact operation), and a contactless touch operation (hereinafter referred to as a hover operation). For example, in a hover operation, as illustrated in FIGS. 2 and 3, the display device 1 detects the finger of the user when the finger approaches the display screen 13A and a distance L between the finger and the display screen 13A becomes less than or equal to a predetermined distance, and detects a touch operation corresponding to the position of the finger. Then, the display device 1 executes input processing corresponding to the touch operation made by the user with respect to the display screen 13A. For example, when the user performs a touch operation in a predetermined position of the display screen 13A, the display device 1 detects a position on the display screen 13A corresponding to the position of the touch operation, and accepts a selection operation in which a selection target is selected using an input operation icon P1 displayed on the display screen 13A.

A hover operation refers to an operation of aligning the input operation icon P1 (such as a cursor) with a specific element (such as an object image of a selection target) using an inputter (such as the hand or fingertip of the user, a stylus pen, or a support rod) on the display screen 13A, and refers to an operation in a state prior to contact being made with the display screen 13A (a hover state where the inputter is suspended in the air). The hover state refers to a state in which the distance between the inputter and the display screen 13A is less than or equal to a predetermined distance, and the inputter is not in contact with the display screen 13A. That is, it refers to a state in which the inputter has been brought close to the display screen 13A.

The display device 1 may have a configuration that is capable of accepting both the touch operation and the hover operation, or may have a configuration that is capable of accepting either the touch operation or the hover operation.

The display panel 13 is a display that displays an image, and is a liquid-crystal display, for example. The operation acceptor 14 is an operation device such as a mouse, a keyboard, and the like. Note that the operation acceptor 14 may also be configured by a touch panel.

Figure 4:
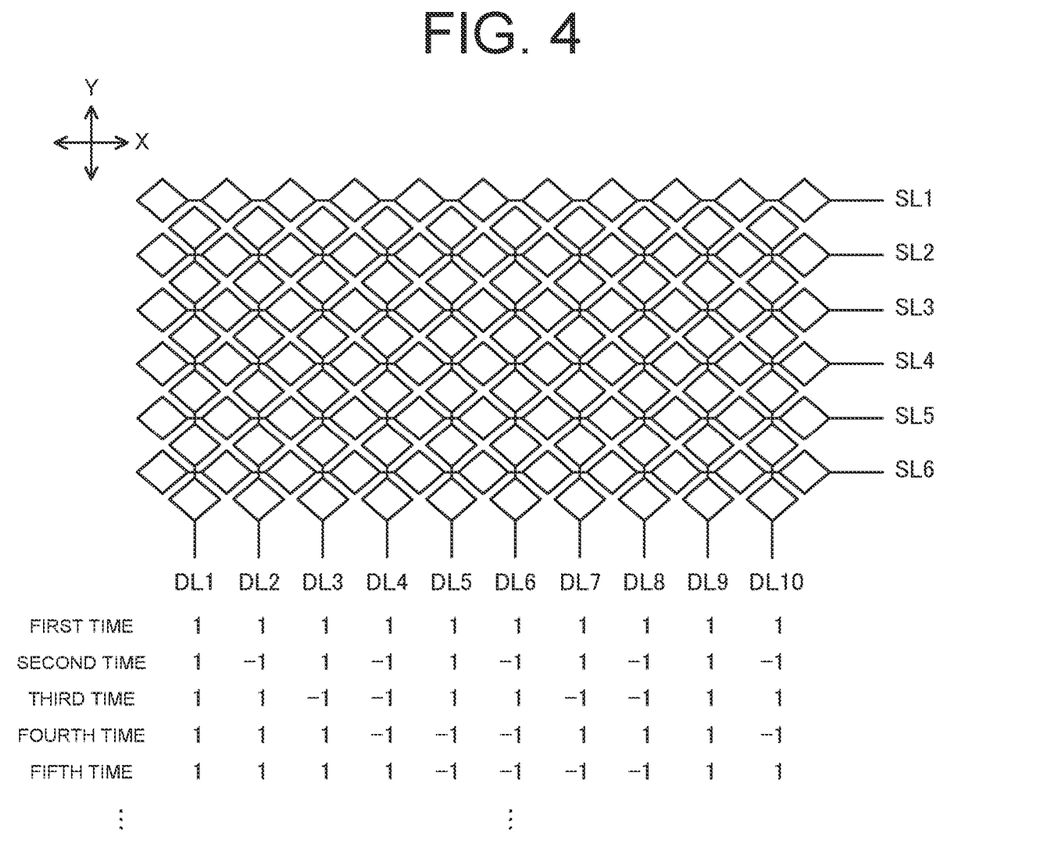
FIG. 4 is a diagram illustrating a configuration of a touch sensor according to the embodiment of the present disclosure.

The touch sensor 15 is, for example, a surface or projection capacitance-type sensor. Note that the touch sensor 15 may be configured by a touch panel superimposed on the surface of the display panel 13. FIG. 4 is a diagram illustrating a configuration of the touch sensor 15. The touch sensor 15 has a plurality of drive electrodes that are multiply arranged in the Y direction and a plurality of sense electrodes that are multiply arranged in the X direction that are arranged so as to intersect each other. Furthermore, the touch sensor 15 includes a plurality of drive lines DL, which include a plurality of drive electrodes and are arranged in parallel in the X direction, and a plurality of sense lines SL, which include a plurality of sense electrodes and are arranged in parallel in the Y direction.

The controller 11 inputs in parallel an input signal represented by the matrix (1, −1) to drive (drive in parallel) the plurality of drive lines DL (see FIG. 4), detects in parallel the output signal from the plurality of sense lines SL, and detects a touch operation (input position) made with respect to the display screen 13A based on a linear element sequence corresponding to the magnitude of the capacitance at each intersection between the plurality of drive lines DL and the plurality of sense lines SL calculated based on a matrix operation of an input sequence corresponding to the magnitude of the input signal and an output sequence corresponding to the magnitude of the output signal. The specific method of detecting the touch operation based on the linear element sequence will be described later.

The storage 12 is a non-volatile storage, such as a hard disk drive (HDD) or a solid state drive (SSD), which stores various kinds of information. In the storage 12, control programs such as a touch operation detection program for causing the controller 11 to execute the touch operation detection processing (see FIG. 9) described later are stored. For example, the touch operation detection program is recorded in a non-transitory manner in a computer-readable recording medium, such as a CD or a DVD, is read by a reader (not illustrated), such as a CD drive or a DVD drive provided in the display device 1, and then stored in the storage 12. The touch operation detection program may be distributed from a cloud server and then stored in the storage 12.

The controller 11 includes control devices such as a CPU, a ROM, and a RAM. The CPU is a processor which executes various kinds of arithmetic processing. The ROM is a non-volatile storage which stores in advance control programs such as a BIOS and an OS for causing the CPU to execute the various kinds of arithmetic processing. The RAM is a volatile or non-volatile storage that stores various types of information, and is used as temporary storage memory (a work area) for various processing executed by the CPU. Further, the controller 11 causes the CPU to execute the various control programs, which are stored in advance in the ROM or the storage 12, to control the display device 1.

Specifically, as shown in FIG. 1, the controller 11 includes various processing units such as a drive processing unit 111, an output detection processing unit 112, a touch operation detection processing unit 113, and a grouping processing unit 114. Note that the controller 11 functions as the drive processing unit 111, the output detection processing unit 112, the touch operation detection processing unit 113, and the grouping processing unit 114 as a result of the CPU executing various processing according to the touch operation detection program. Furthermore, some or all of the processing units included in the controller 11 may be configured by an electronic circuit. The touch operation detection program may be a program for instructing a plurality of processors to function as the various types of processing units.

The drive processing unit 111 inputs an input signal (drive signal) with respect to the plurality of drive lines DL. Specifically, the drive processing unit 111 drives all of the drive lines DL in parallel using a matrix of an input sequence corresponding to the magnitude of the input signal. For example, the drive processing unit 111 drives all of the drive lines DL in parallel using a code sequence composed of a Hadamard matrix as the input sequence corresponding to the magnitude of the input signal.

The output detection processing unit 112 detects the output signal (detection signal) that is output from the plurality of sense lines SL. Specifically, the output detection processing unit 112 detects the output signal from the plurality of sense lines SL in parallel.

The touch operation detection processing unit 113 detects a touch operation made with respect to the touch sensor 15 based on a linear element sequence (capacitance sequence) calculated by a matrix operation of an input sequence corresponding to the magnitude of the input signal and an output sequence corresponding to the magnitude of the output signal. As the method of detecting the touch operation based on the linear element sequence, for example, the method disclosed in Japanese Patent Publication No. 4927216 can be applied. An example of the detection method of the touch operation will be described using FIG. 5.

Figure 5:
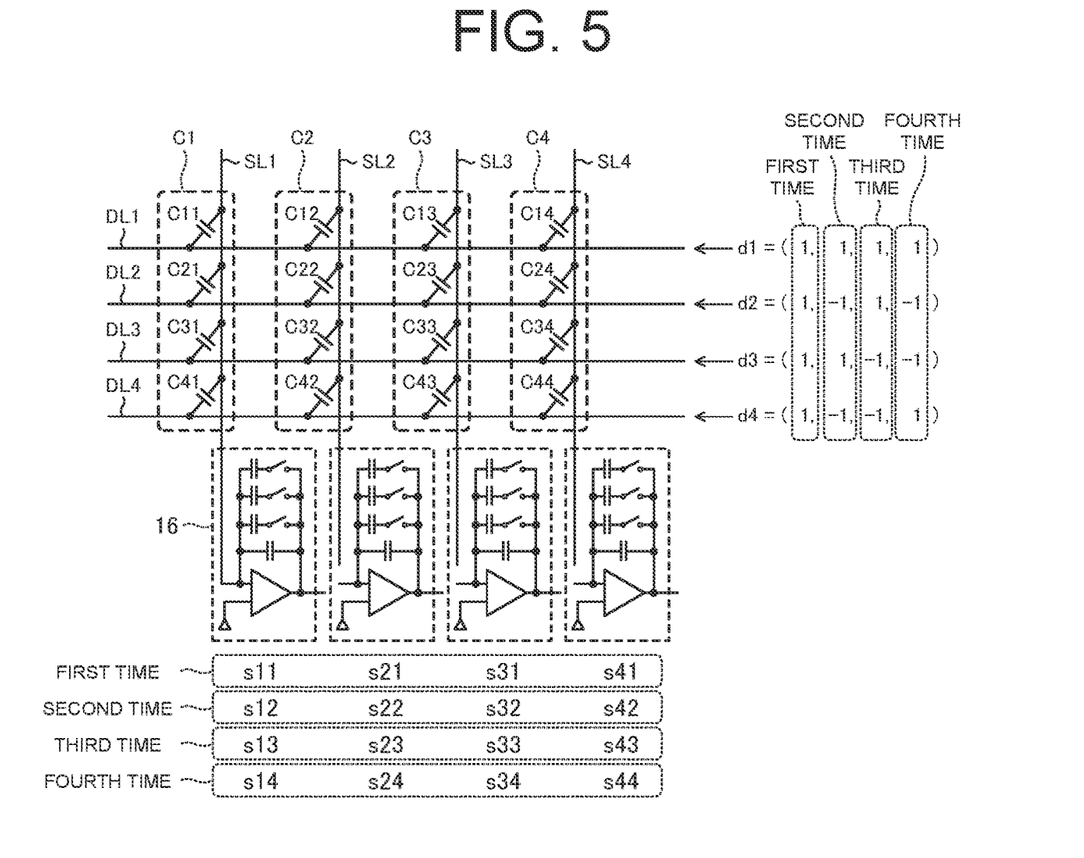
FIG. 5 is a diagram schematically illustrating an example of a matrix operation in the display device according to the embodiment of the present disclosure.

In FIG. 5, in order to simplify the description, it is assumed that the touch sensor 15 is provided with four drive lines DL1 to DL4 and four sense lines SL1 to SL4. The capacitances C11 to C44 are formed at each intersection between the drive lines DL1 to DL4 and the sense lines SL1 to SL4. Furthermore, an example is shown here in which the code sequence corresponding to the input sequence is composed of a fourth-order Hadamard matrix generated by the Sylvester method.

An analog integrator 16 is connected to each of the sense lines SL. The analog integrator 16 includes an operational amplifier with one input connected to a reference voltage, an integrated capacitance having a capacitance arranged between the output of the operational amplifier and the other input, three additional integrated capacitances each connected in parallel to the integrated capacitance, and three switches each provided between the three additional integrated capacitances and the output of the operational amplifier.

For example, at the first drive timing, the drive processing unit 111 inputs an input signal having the code sequence d1 to d4 (1, 1, 1, 1) to each of the drive lines DL1 to DL4, and the output detection processing unit 112 detects the output signal that is output from the sense lines SL1 to SL4 (s11, s21, s31 and s41). Then, at the second drive timing, the drive processing unit 111 inputs an input signal having the code sequence d1 to d4 (1, −1, 1, −1) to each of the drive lines DL1 to DL4, and the output detection processing unit 112 detects the output signal that is output from the sense lines SL1 to SL4 (s12, s22, s32 and s42). Next, at the third drive timing, the drive processing unit 111 inputs an input signal having the code sequence d1 to d4 (1, 1, −1, −1) to each of the drive lines DL1 to DL4, and the output detection processing unit 112 detects the output signal that is output from the sense lines SL1 to SL4 (s13, s23, s33 and s43). Further, at the fourth drive timing, the drive processing unit 111 inputs an input signal having the code sequence d1 to d4 (1, −1, −1, 1) to each of the drive lines DL1 to DL4, and the output detection processing unit 112 detects the output signal that is output from the sense lines SL1 to SL4 (s14, s24, s34 and s44).

The touch operation detection processing unit 113 calculates a capacitance value C based on an inner product operation of the output S of the capacitance sequence and the Hadamard matrix H corresponding to the code sequence, and detects a touch operation (input position) based on a change in the capacitance value C. For example, the touch operation detection processing unit 113 calculates the capacitance value C by the matrix operation equation "CH=GS" (where G is a proportionality factor).

In the example shown in FIG. 5, the touch operation detection processing unit 113 calculates each capacitance value based on an inner product operation between the output S made up of the output s1=(s11, s12, s13, s14) from the first capacitance sequence C1 between the drive lines DL1 to DL4 and the sense line SL1, the output s2=(s21, s22, s23, s24) from the second capacitance sequence C2 between the drive lines DL1 to DL4 and the sense line SL2, the output s3=(s31, s32, s33, s34) from the third capacitance sequence C3 between the drive lines DL1 to DL4 and the sense line SL3, and the output s4=(s41, s42, s43, s44) from the fourth capacitance sequence C4 between the drive lines DL1 to DL4 and the sense line SL4, and a Hadamard matrix H composed of the code sequence d1 (1, 1, 1, 1) input to the drive line DL1, the code sequence d2 (1, −1, 1, −1) input to the drive line DL2, the code sequence d3 (1, 1, −1, −1) input to the drive line DL3, and the code sequence d4 (1, −1, −1, 1) input to the drive line DL4. For example, the matrix operation equation is expressed as in equation (1) below.

Equation 1

$$\begin{bmatrix} C11 & C21 & C31 & C41 \\ C12 & C22 & C32 & C42 \\ C13 & C23 & C33 & C43 \\ C14 & C24 & C34 & C44 \end{bmatrix} \begin{bmatrix} 1 & 1 & 1 & 1 \\ 1 & -1 & 1 & -1 \\ 1 & 1 & -1 & -1 \\ 1 & -1 & -1 & 1 \end{bmatrix} = \quad \text{Equation (1)}$$

$$G \begin{bmatrix} s11 & s21 & s31 & s41 \\ s12 & s22 & s32 & s43 \\ s13 & s23 & s33 & s34 \\ s14 & s24 & s34 & s44 \end{bmatrix}$$

In this way, the controller 11 drives all of the drive lines DL in parallel using the matrix (1, −1), and detects a touch operation (input position) by performing matrix operation processing. When the plurality of drive lines DL are driven in parallel using an nth order Hadamard matrix, a signal strength that is n times stronger can be obtained compared to a case where the drive lines DL1 are successively driven one at a time.

Here, in the display device 1, further enhancement of the signal strength of detection signals is sought in order to detect more accurately a small change in the capacitance value due to a touch operation. Therefore, the display device 1 according to the present embodiment further includes the grouping processing unit 114.

The grouping processing unit 114 groups the plurality of drive lines DL into a plurality of groups each having a set grouped number of adjacent drive lines DL. Specifically, the grouping processing unit 114 sets the grouped number based on the signal strength of the output signal detected by the output detection processing unit 112. For example, the grouping processing unit 114 sets the grouped number to M when the signal strength of the output signal is greater than or equal to a threshold, and sets the grouped number to N when the signal strength of the output signal is less than the threshold (where M and N are natural numbers, and M<N).

The drive processing unit 111 inputs the input signal having the same pattern to each of the grouped number of drive lines DL that have been grouped by the grouping processing unit 114. For example, when the grouping processing unit 114 sets the grouped number to M, the drive processing unit 111 inputs an input signal having the same code sequence to each group of M drive lines DL. Further, when the grouping processing unit 114 sets the grouped number to N, the drive processing unit 111 inputs an input signal having the same code sequence to each group of N drive lines DL.

A specific example will be described below. For example, when the user performs a touch operation (for example, a hover operation), and the touch operation is performed with the hand of the user in a position near the touch panel (touch sensor 15), the signal strength of the output signal detected by the output detection processing unit 112 increases. On the other hand, when the touch operation is performed with the hand of the user in a position far from the touch panel (touch sensor 15), the signal strength of the output signal detected by the output detection processing unit 112 decreases.

Figure 6:
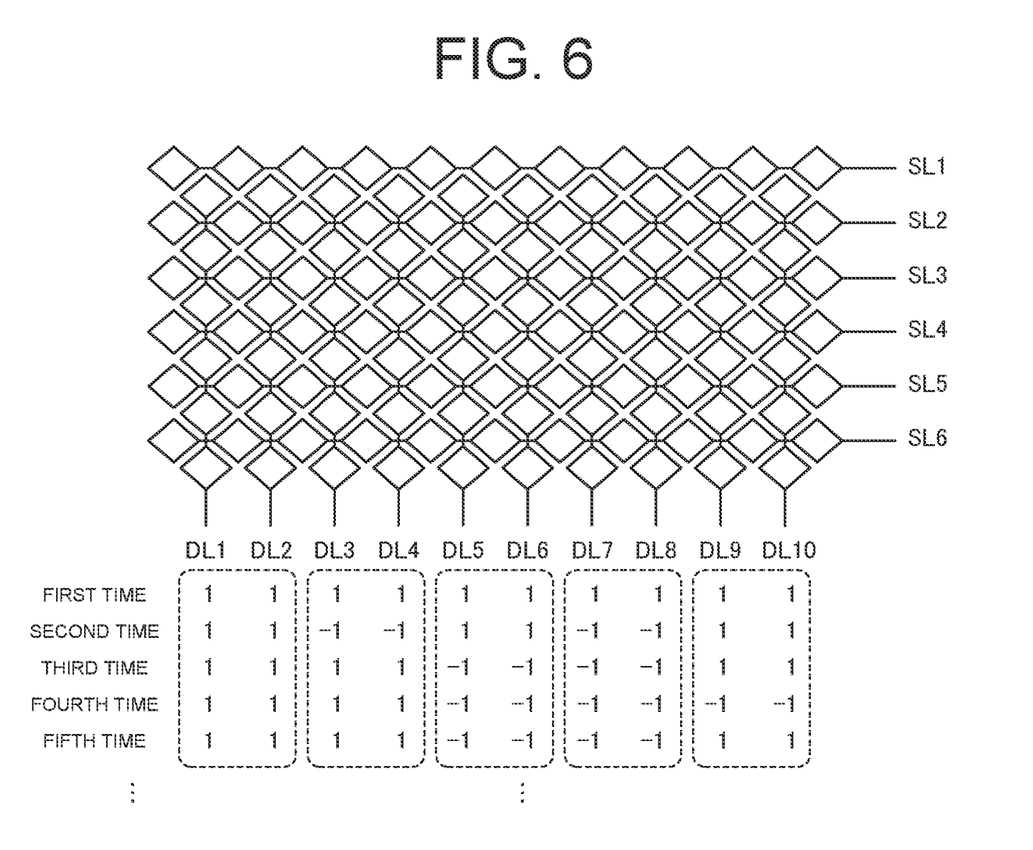
FIG. 6 is a diagram schematically illustrating an example of an input signal of the display device according to the embodiment of the present disclosure.

The grouping processing unit 114 sets the grouped number to "2" (M=2) when the hand of the user is near the touch panel and the signal strength of the output signal is greater than or equal to a threshold. In this case, as shown in FIG. 6, the drive processing unit 111 inputs an input signal having the same code sequence to each group of two adjacent drive lines DL. For example, at each drive timing, the drive processing unit 111 inputs an input signal having the same code sequence to the drive lines DL1 and DL2, inputs an input signal having the same code sequence to the drive lines DL3 and DL4, inputs an input signal having the same code sequence to the drive lines DL5 and DL6, inputs an input signal having the same code sequence to the drive lines DL7 and DL8, and inputs an input signal having the same code sequence to the drive lines DL9 and DL10. In this case, the controller 11 detects a touch operation by considering two adjacent drive lines DL as a single drive line DL. According to this drive method, for example, when the user brings the hand close to the touch panel and performs a touch operation, the position detection accuracy of the touch operation can be increased.

Figure 7:
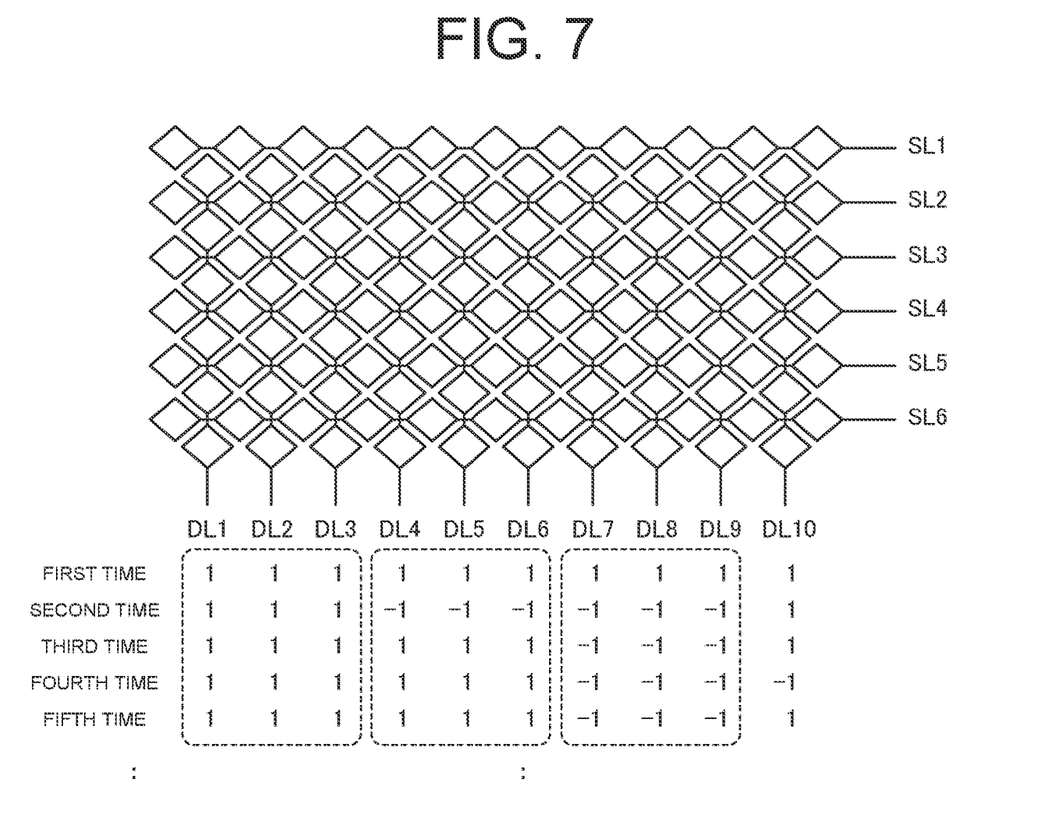
FIG. 7 is a diagram schematically illustrating an example of an input signal of the display device according to the embodiment of the present disclosure.

In contrast, the grouping processing unit 114 sets the grouped number to "3" (N=3) when the hand of the user is far from the touch panel and the signal strength of the output signal is less than the threshold. In this case, as shown in FIG. 7, the drive processing unit 111 inputs an input signal having the same code sequence to each group of three adjacent drive lines DL. For example, at each drive timing, the drive processing unit 111 inputs an input signal having the same code sequence to the drive lines DL1, DL2 and DL3, inputs an input signal having the same code sequence to the drive lines DL4, DL5 and DL6, and inputs an input signal having the same code sequence to the drive lines DL7, DL8 and DL9. In this case, the controller 11 detects a touch operation by considering three adjacent drive lines DL as a single drive line DL. According to this drive method, because three drive lines DL can be used as a single drive electrode, the electric lines of force that are formed between the drive electrodes and the sense electrodes can be extended to a position far from the touch panel. As a result, for example, it is possible to detect with certainty the position of a touch operation even when the user moves the hand away from the touch panel.

As another embodiment, the drive processing unit 111 may switch between a first drive mode in which the input signal having the same pattern is input to each group of M drive lines, and a second drive mode in which the input signal having the same pattern is input to each group of N drive lines. For example, the drive processing unit 111 may switch to the first drive mode when an operation mode is a first operation mode (contact operation mode) that accepts a touch operation due to contact being made with respect to the touch panel, and switch to the second drive mode when the operation mode is a second operation mode (hover operation mode) that accepts a contactless touch operation being made with respect to the touch panel. For example, when the operation mode is set to the contact operation mode, the drive processing unit 111 inputs the input signal having the same pattern to each single drive line. Further, when the operation mode is set to the hover operation mode, the drive processing unit 111 inputs the input signal having the same pattern to each group of three drive lines.

Moreover, as another embodiment, the grouping processing unit 114 may set the grouped number to a smaller value the closer the hand of the user is to the touch panel, and may set the grouped number to a larger value the further the hand of the user is from the touch panel.

Figure 8:
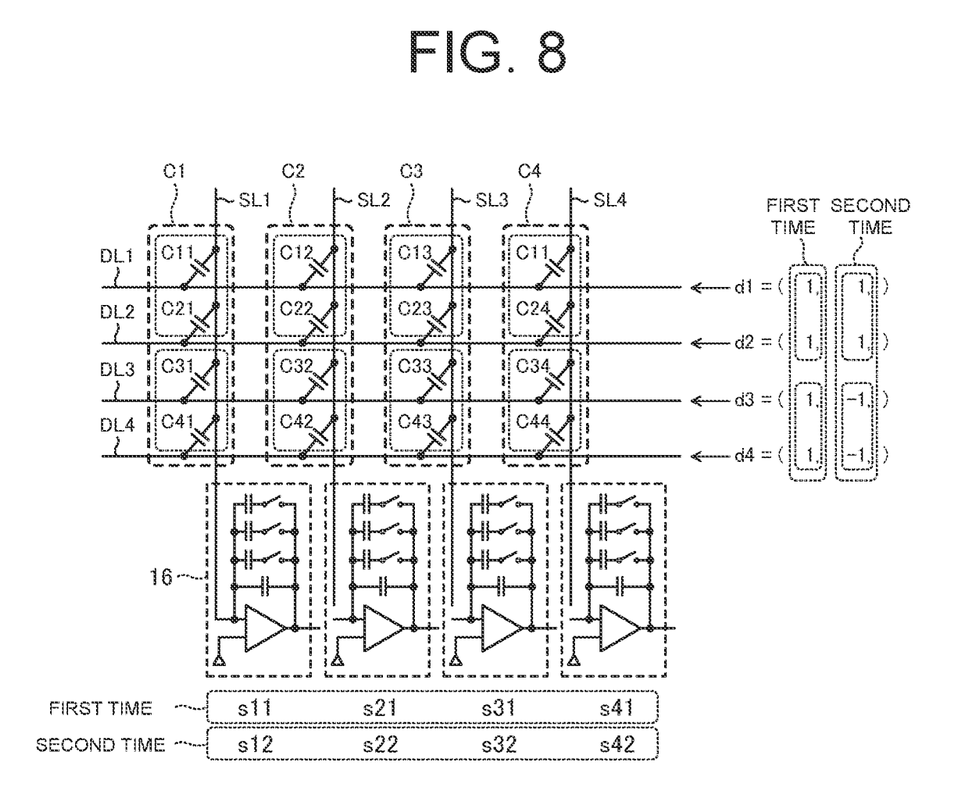
FIG. 8 is a diagram schematically illustrating an example of a matrix operation in the display device according to the embodiment of the present disclosure.

Here, an example of a matrix operation method when a plurality of drive lines DL are grouped will be described. FIG. 8 shows an example where two drive lines DL are grouped (an example where M=2). The controller 11 performs the matrix operation by considering two grouped drive lines DL as a single drive line DL.

As shown in FIG. 8, at the first drive timing, the drive processing unit 111 inputs the same code sequence d1 and d2 (1, 1) to the drive lines DL1 and DL2, and inputs the same code sequence d3 and d4 (1, 1) to the drive lines DL3 and DL4. In this case, the input signal is expressed as a second order Hadamard matrix H (see equation (2) below).

In terms of the matrix of the linear element sequence (capacitance sequence), the touch operation detection processing unit 113 considers the sum of the capacitances C11 and C21 (C11+C21) as a single capacitance, the sum of the capacitances C31 and C41 (C31+C41) as a single capacitance, the sum of the capacitances C12 and C22 (C12+C22) as a single capacitance, and the sum of the capacitances C32 and C42 (C32+C42) as a single capacitance. The touch operation detection processing unit 113 calculates each capacitance value based on an inner product operation of the output S made up of the output s1=(s11, s12) from a first capacitance sequence C1 between the drive lines DL1 to DL4 and the sense line SL1, the output s2=(s21, s22) from a second capacitance sequence C2 between the drive lines DL1 to DL4 and the sense line SL2, and a second order Hadamard matrix H. For example, the matrix operation equation is expressed as in equation (2) below.

Equation 2

$$\begin{bmatrix} C11+C21 & C31+C41 \\ C12+C22 & C32+C42 \end{bmatrix} \begin{bmatrix} 1 & 1 \\ 1 & -1 \end{bmatrix} = G \begin{bmatrix} s11 & s12 \\ s21 & s22 \end{bmatrix} \qquad \text{Equation (2)}$$

Furthermore, as shown in FIG. 8, at the second drive timing, the drive processing unit 111 inputs the same code sequence d1 and d2 (1, 1) to the drive lines DL1 and DL2, and inputs the same code sequence d3 and d4 (−1, −1) to the drive lines DL3 and DL4. In this case, the input signal is expressed as a second order Hadamard matrix H (see equation (3) below).

In terms of the matrix of the linear element sequence (capacitance sequence), the touch operation detection processing unit 113 considers the sum of the capacitances C13 and C23 (C13+C23) as a single capacitance, the sum of the capacitances C33 and C43 (C33+C43) as a single capacitance, the sum of the capacitances C14 and C24 (C14+C24) as a single capacitance, and the sum of the capacitances C34 and C44 (C34+C44) as a single capacitance. The touch operation detection processing unit 113 calculates each capacitance value based on an inner product operation of the output S made up of the output s3=(s31, s32) from a third capacitance sequence C3 between the drive lines DL1 to DL4 and the sense line SL3, the output s4=(s41, s42) from a fourth capacitance sequence C4 between the drive lines DL1 to DL4 and the sense line SL4, and a second order Hadamard matrix H. For example, the matrix operation equation is expressed as in equation (3) below.

Equation 3

$$\begin{bmatrix} C13+C23 & C33+C43 \\ C14+C24 & C34+C44 \end{bmatrix} \begin{bmatrix} 1 & 1 \\ 1 & -1 \end{bmatrix} = G \begin{bmatrix} s31 & s32 \\ s41 & s42 \end{bmatrix} \quad \text{Equation (3)}$$

In this way, the touch operation detection processing unit 113 considers, among each component in the input sequence and the capacitance sequence, a plurality of components corresponding to each of the grouped number of drive lines DL as a single component, and calculates the capacitance sequence based on a matrix operation of the input sequence and the output sequence. According to the configuration described above, because each group of two drive lines DL can be grouped and considered as a single drive line DL, the required matrix size can be halved.

Touch Operation Detection Processing

Figure 9:
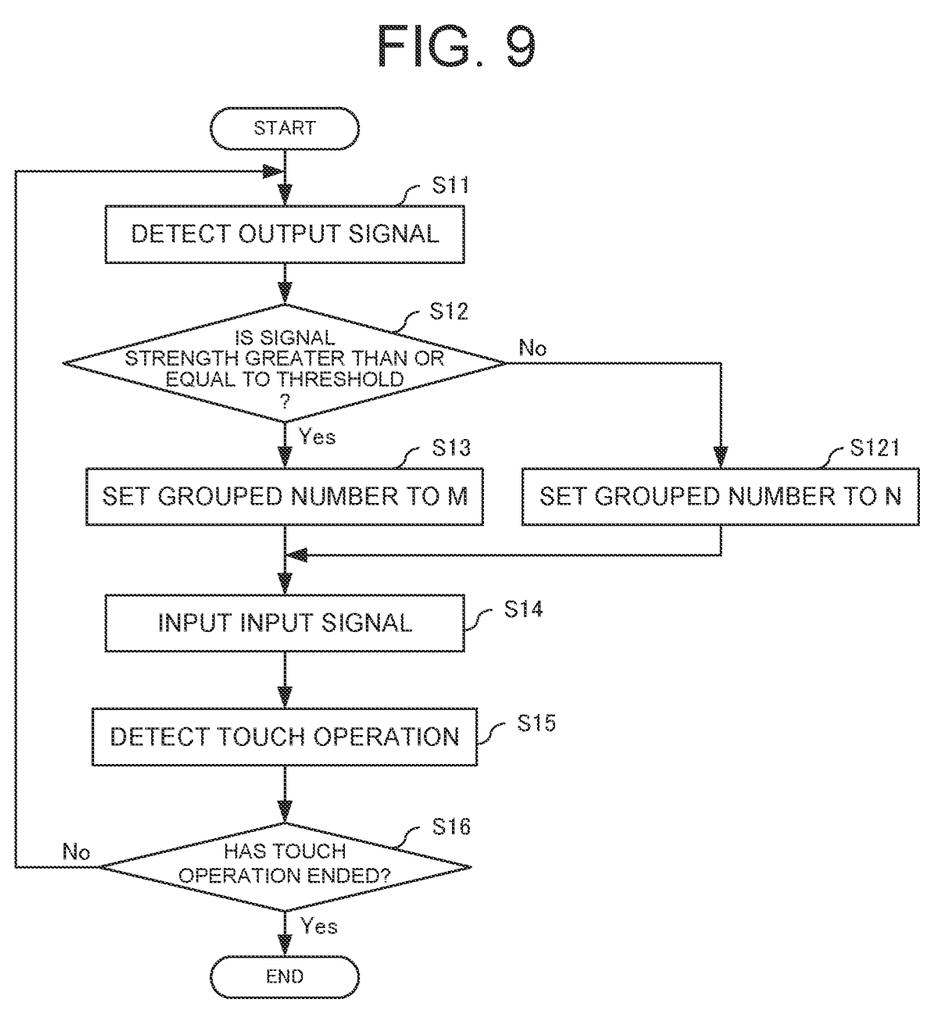
FIG. 9 is a flowchart for describing an example of the procedure of touch operation detection processing executed in the display device according to the embodiment of the present disclosure.

Hereinafter, the touch operation detection processing executed by the controller 11 of the display device 1 will be described with reference to FIG. 9.

The present disclosure can be regarded as a touch operation detection method that executes one or more of the steps included in the touch operation detection processing, and one or more steps included in the touch operation detection processing described here may be omitted as appropriate. The order of the steps of the touch operation detection processing may be different as long as the same operational effects are obtained. In addition, although an example where the controller 11 executes the steps of the touch operation detection processing will be described here, a touch operation detection method in which the steps of the touch operation detection processing are distributed to, and executed by, a plurality of processors can be considered as another embodiment.

First, in step S11, the controller 11 detects an output signal. Specifically, the controller 11 simultaneously inputs (drives in parallel) an input signal of a code sequence to the plurality of drive lines DL, and detects an output signal that is output from the sense lines SL1 to SL4.

Then, in step S12, the controller 11 determines whether or not the signal strength of the output signal is greater than or equal to a threshold. The signal strength is, for example, the magnitude of an integrated sum of the current flowing to the capacitances of the linear element sequence (capacitance sequence). When the controller 11 determines that the signal strength of the output signal is greater than or equal to the threshold (S12: Yes), the processing proceeds to step S13. On the other hand, when the controller 11 determines that the signal strength of the output signal is less than the threshold (S12: No), the processing proceeds to step S121.

In step S13, the controller 11 sets the grouped number of drive lines DL to M. For example, the controller 11 sets the grouped number of drive lines DL to "2". On the other hand, in step S121, the controller 11 sets the grouped number of drive lines DL to N (where M and N are natural numbers, and M<N). For example, the controller 11 sets the grouped number of drive lines DL to "3".

Next, in step S14, the controller 11 inputs an input signal based on the set grouped number. For example, when the controller 11 sets the grouped number of drive lines DL to "2", as shown in FIG. 6, it inputs the input signal having the same code sequence to each group of two adjacent drive lines DL. Furthermore, for example, when the controller 11 sets the grouped number of drive lines DL to "3", as shown in FIG. 7, it inputs the input signal having the same code sequence to each group of three adjacent drive lines DL.

Then, in step S15, the controller 11 detects a touch operation. Specifically, the controller 11 calculates a capacitance value C based on an inner product operation of the output S of the capacitance sequence and the Hadamard matrix H corresponding to the code sequence, and detects a touch operation (input position) based on a change in the capacitance value C (see FIGS. 6 and 7, and equations (2) and (3)).

Then, in step S16, the controller 11 determines whether or not the touch operation has ended. When the user ends the touch operation with respect to the touch panel (display screen 13A), the controller 11 determines that the touch operation has ended (S16: Yes) and ends the touch operation detection processing. On the other hand, when the user continues the touch operation with respect to the touch panel, the controller 11 determines that the touch operation has not ended (S16: No), and the processing proceeds to step S11. The controller 11 executes the touch operation detection processing as described above.

As described above, the display device 1 according to the present embodiment is a device that, in a touch panel provided with a plurality of drive lines DL arranged in parallel, and a plurality of sense lines SL arranged in parallel and intersecting the plurality of drive lines DL, inputs an input signal with respect to the plurality of drive lines DL in parallel and drives the plurality of drive lines DL, detects an output signal from the plurality of sense lines SL in parallel, and detects a touch operation made with respect to the touch panel based on a linear element sequence corresponding to a magnitude of a capacitance at each intersection between the plurality of drive lines DL and the plurality of sense lines SL calculated based on a matrix operation of an input sequence corresponding to a magnitude of the input signal and an output sequence corresponding to a magnitude of the output signal.

Moreover, the display device 1 inputs the input signal to the plurality of drive lines DL, and detects the output signal that is output from the plurality of sense lines SL. In addition, the display device 1 groups the plurality of drive lines DL into a plurality of groups each having a set grouped number of adjacent drive lines DL, and inputs the input signal having the same pattern to each grouped number of drive lines DL that have been grouped. Further, the display device 1 detects a touch operation made with respect to the touch panel based on the linear element sequence calculated by a matrix operation of the input sequence and the output sequence.

According to the configuration described above, for example, when the user performs a touch operation by bringing the hand close to the touch panel, because it is possible to increase the spatial resolution by setting the grouped number of drive lines DL to a smaller number, it is possible to increase the position detection accuracy of the touch operation. Furthermore, for example, when the user performs a touch operation with the hand far from the touch panel, by setting the grouped number of drive lines DL to a larger number, the electric lines of force formed between the drive electrodes and the sense electrodes can be extended to a position far from the touch panel, and because the signal strength can be increased, a touch operation performed in a position away from the touch panel can be detected with certainty. That is, the distance from the touch panel (hover distance) in which a touch operation can be detected can be increased. Therefore, it is possible to ensure the hover distance while also improving the position detection accuracy.

Moreover, according to the configuration described above, because a touch operation can be detected by adjusting the grouped number without additional hardware, the cost does not increase.

The controller 11 may dynamically (in real time) change the grouped number based on the signal strength of the output signal when the user is performing a touch operation. Also, the controller 11 may also be capable of accepting an operation from the user that sets the grouped number.

Furthermore, as another embodiment, the controller 11 may set the grouped number to M when the distance L (operation distance) between the finger of the user and the display screen 13A (see FIG. 3) is less than a predetermined distance, and set the grouped number to N when the distance L is greater than or equal to the predetermined distance (where M and N are natural numbers, and M<N).

The touch operation detection device of the present disclosure may be the display device 1, or may be the controller 11 (control device), which is a component of the display device 1. That is, the touch operation detection device of the present disclosure includes the controller 11, and does not have to include the display panel 13 and the touch sensor 15 (touch panel).

Supplementary Notes of Disclosure

An outline of the disclosure derived from the above embodiments will be described as supplementary notes. The configurations and the processing functions described in the following supplementary notes can be selected to be added or deleted and combined arbitrarily.

Supplementary Note 1

A touch operation detection device that, in a touch panel provided with a plurality of drive lines arranged in parallel, and a plurality of sense lines arranged in parallel and intersecting the plurality of drive lines, inputs an input signal with respect to the plurality of drive lines in parallel and drives the plurality of drive lines, detects an output signal from the plurality of sense lines in parallel, and detects a touch operation made with respect to the touch panel based on a linear element sequence corresponding to a magnitude of a capacitance at each intersection between the plurality of drive lines and the plurality of sense lines calculated based on a matrix operation of an input sequence corresponding to a magnitude of the input signal and an output sequence corresponding to a magnitude of the output signal, the touch operation detection device comprising: a drive processing unit that inputs the input signal with respect to the plurality of drive lines; an output detection processing unit that detects the output signal that is output from the plurality of sense lines; a grouping processing unit that groups the plurality of drive lines into a plurality of groups each having a set grouped number of adjacent drive lines; and a touch operation detection processing unit that detects a touch operation made with respect to the touch panel based on the linear element sequence calculated by a matrix operation of the input sequence and the output sequence; wherein the drive processing unit inputs the input signal having the same pattern to each of the grouped number of drive lines that have been grouped by the grouping processing unit.

Supplementary Note 2

The touch operation detection device according to supplementary note 1, wherein the touch operation detection processing unit considers, among each component in the input sequence and the linear element sequence, a plurality of components corresponding to each of the grouped number of drive lines as a single component, and calculates the linear element sequence based on a matrix operation of the input sequence and the output sequence.

Supplementary Note 3

The touch operation detection device according to supplementary notes 1 or 2, wherein the grouping processing unit sets the grouped number based on a signal strength of the output signal detected by the output detection processing unit.

Supplementary Note 4

The touch operation detection device according to supplementary note 3, wherein the grouping processing unit sets the grouped number to M when the signal strength is greater than or equal to a threshold, and sets the grouped number to N when the signal strength is less than the threshold (where M and N are natural numbers, and M<N).

Supplementary Note 5

The touch operation detection device according to supplementary note 4, wherein the drive processing unit switches between a first drive mode in which the input signal having the same pattern is input to each of the M drive lines, and a second drive mode in which the input signal having the same pattern is input to each of the N drive lines.

Supplementary Note 6

The touch operation detection device according to supplementary note 5, wherein the drive processing unit switches to the first drive mode when an operation mode is a first operation mode that accepts a touch operation due to contact being made with respect to the touch panel, and switches to the second drive mode when the operation mode is a second operation mode that accepts a contactless touch operation being made with respect to the touch panel.

Supplementary Note 7

The touch operation detection device according to supplementary note 1, wherein the drive processing unit drives the plurality of drive lines in parallel using a code sequence composed of a Hadamard matrix as the input sequence.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A touch operation detection device that, in a touch panel provided with a plurality of drive lines arranged in parallel, and a plurality of sense lines arranged in parallel and intersecting the plurality of drive lines, inputs an input signal with respect to the plurality of drive lines in parallel and drives the plurality of drive lines, detects an output signal from the plurality of sense lines in parallel, and detects a touch operation made with respect to the touch panel based on a linear element sequence corresponding to a magnitude of a capacitance at each intersection between the plurality of drive lines and the plurality of sense lines calculated based on a matrix operation of an input sequence corresponding to a magnitude of the input signal and an output sequence corresponding to a magnitude of the output signal, the touch operation detection device comprising:
- a drive processing circuit that inputs the input signal with respect to the plurality of drive lines;
- an output detection processing circuit that detects the output signal that is output from the plurality of sense lines;
- a grouping processing circuit that groups the plurality of drive lines into a plurality of groups each having a set grouped number of adjacent drive lines; and
- a touch operation detection processing circuit that detects a touch operation made with respect to the touch panel based on the linear element sequence calculated by a matrix operation of the input sequence and the output sequence; wherein the drive processing circuit inputs the input signal having the same pattern to each of the grouped number of drive lines that have been grouped by the grouping processing circuit.

2. The touch operation detection device according to claim 1, wherein the touch operation detection processing circuit considers, among each component in the input sequence and the linear element sequence, a plurality of components corresponding to each of the grouped number of drive lines as a single component, and calculates the linear element sequence based on a matrix operation of the input sequence and the output sequence.

3. The touch operation detection device according to claim 1, wherein the grouping processing circuit sets the grouped number based on a signal strength of the output signal detected by the output detection processing circuit.

4. The touch operation detection device according to claim 3, wherein the grouping processing circuit sets the grouped number to M when the signal strength is greater than or equal to a threshold, and sets the grouped number to N when the signal strength is less than the threshold (where M and N are natural numbers, and M<N).

5. The touch operation detection device according to claim 4, wherein the drive processing circuit switches between a first drive mode in which the input signal having the same pattern is input to each of the M drive lines, and a second drive mode in which the input signal having the same pattern is input to each of the N drive lines.

6. The touch operation detection device according to claim 5, wherein the drive processing circuit switches to the first drive mode when an operation mode is a first operation mode that accepts a touch operation due to contact being made with respect to the touch panel, and switches to the second drive mode when the operation mode is a second operation mode that accepts a contactless touch operation being made with respect to the touch panel.

7. The touch operation detection device according to claim 1, wherein the drive processing circuit drives the plurality of drive lines in parallel using a code sequence composed of a Hadamard matrix as the input sequence.

8. A touch operation detection method that, in a touch panel provided with a plurality of drive lines arranged in parallel, and a plurality of sense lines arranged in parallel and intersecting the plurality of drive lines, inputs an input signal with respect to the plurality of drive lines in parallel and drives the plurality of drive lines, detects an output signal from the plurality of sense lines in parallel, and detects a touch operation made with respect to the touch panel based on a linear element sequence corresponding to a magnitude of a capacitance at each intersection between the plurality of drive lines and the plurality of sense lines calculated based on a matrix operation of an input sequence corresponding to a magnitude of the input signal and an output sequence corresponding to a magnitude of the output signal, the method causing one or more processors to execute:
- inputting the input signal with respect to the plurality of drive lines;
- detecting the output signal that is output from the plurality of sense lines;
- grouping the plurality of drive lines into a plurality of groups each having a set grouped number of adjacent drive lines;
- detecting a touch operation made with respect to the touch panel based on the linear element sequence calculated by a matrix operation of the input sequence and the output sequence; and
- inputting the input signal having the same pattern to each of the grouped number of drive lines that have been grouped.

* * * * *